United States Patent
Lim et al.

(10) Patent No.: US 12,340,912 B2
(45) Date of Patent: Jun. 24, 2025

(54) SINTERING ADDITIVE FOR FORMING FILM CAPABLE OF IMPROVING OXIDATION RESISTANCE OF NUCLEAR FUEL PELLETS, AND PREPARATION METHOD THEREFOR

(71) Applicants: Kwang-young Lim, Seoul (KR); Tae-sik Jung, Sejong (KR); Yeon-su Na, Daejeon (KR); Min-jae Joo, Sejong (KR); Seung-jae Lee, Daejeon (KR); Yoon-ho Kim, Daejeon (KR)

(72) Inventors: Kwang-young Lim, Seoul (KR); Tae-sik Jung, Sejong (KR); Yeon-su Na, Daejeon (KR); Min-jae Joo, Sejong (KR); Seung-jae Lee, Daejeon (KR); Yoon-ho Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 460 days.

(21) Appl. No.: 17/701,240

(22) Filed: Mar. 22, 2022

(65) Prior Publication Data
US 2022/0223303 A1    Jul. 14, 2022

Related U.S. Application Data

(63) Continuation of application No. PCT/KR2019/014543, filed on Oct. 31, 2019.

(30) Foreign Application Priority Data

Sep. 25, 2019  (KR) .................. 10-2019-0118276

(51) Int. Cl.
*G21C 3/62*  (2006.01)
(52) U.S. Cl.
CPC .................. *G21C 3/623* (2013.01)

(58) Field of Classification Search
CPC .................. C04B 35/51; G21C 3/623
See application file for complete search history.

(56) References Cited

U.S. PATENT DOCUMENTS

| | | | |
|---|---|---|---|
| 10,847,271 B1 * | 11/2020 | Cooper | G21C 3/60 |
| 2010/0091933 A1 | 4/2010 | Song et al. | |

FOREIGN PATENT DOCUMENTS

| | | |
|---|---|---|
| KR | 10-0446587 B1 | 9/2004 |
| KR | 10-0521638 B1 | 10/2005 |

(Continued)

OTHER PUBLICATIONS

Kim, Keon-Sik, et al. "Sintering of a Mixture of UO2 and Gd2O3 Powders Doped With Cr2 O3—SiO2." Nuclear Engineering and Technology 33.4 (2001): 386-396. (Year: 2001).*

(Continued)

*Primary Examiner* — Sharon M Davis
(74) *Attorney, Agent, or Firm* — Reinhart Boerner Van Deuren P.C.

(57) ABSTRACT

Proposed are nuclear fuel pellets showing high oxidation resistance in a steam atmosphere and a method for manufacturing same. The method includes: preparing a powder mixture by mixing a sintering additive powder including Cr2O3, MnO, and SiO2 with a uranium dioxide powder; forming a molded body by subjecting the powder mixture to compression molding; and sintering the molded body in a weak oxidative atmosphere in which an oxygen potential is −581.9 kJ/mol to −218.2 kJ/mol. The nuclear fuel pellets contain 0.05% to 0.16% by weight of the sintering additive composed of Cr2O3, MnO, and SiO2. A liquid phase generated during the sintering accelerates grain growth and inhibits reaction between uranium dioxide with steam by forming a film at the grain boundary of the uranium dioxide. This reduces leakage of a fission material by improving (Continued)

high-temperature water vapor oxidation resistance at around 1204° C. in a loss-of-coolant accident condition.

1 Claim, 8 Drawing Sheets

(56) References Cited

FOREIGN PATENT DOCUMENTS

| KR | 1020140087897 A | 7/2014 |
|---|---|---|
| KR | 1020160051113 A | 5/2016 |
| KR | 1020180027390 A | 3/2018 |
| WO | WO 2019/107655 A1 | 6/2019 |

OTHER PUBLICATIONS

Massih, A. R., "Effects of additives on uranium dioxide fuel behavior" (Report), Strålsäkerhetsmyndigheten (SSM), Jan. 2014, vol. 2014, No. 21, 62 pages. URL: https://www.stralsakerhetsmyndigheten.se/contentassets/af14180bb6a94795a26c233fd4351d7b/201421-effects-of-additives-on-uranium-dioxide-fuel-behavior.

"Incorporation pf Chromia-Doped Fuel Properties in AREVA Approved Methods" (Topical Report), *AREVA Inc.*, Apr. 2016, No. ANP-10340NP, 107 pages.

"Additive Fuel Pellets for GNF Fuel Designs" (Licensing Topical Report), *Global Nuclear Fuels-Americas, LLC*, Dec. 2009, No. NEDO-33406, 110 pages.

Une et al., "Corrosion behavior of irradiated oxide fuel pellets in high temperature water" (Journal), *Journal of Nuclear Materials*, Sep. 2, 1996, vol. 232, No. 2-3, pp. 240-247. DOI:10.1016/S0022-3115(96)00363-7.

Jacob, K.T., "Revision of Thermodynamic Data on MnO—$Al^2O_3$ Melts" (Journal), *Canadian Metallurgical Quarterly*, 1981, vol. 20, No. 1, pp. 89-92. DOI:10.1179/cmq.1981.20.1.89.

Jang Soo Oh et al., "Recycling Process of $U_3O_8$ Powder in MnO—$Al_2O_3$ Doped Large Grain $UO_2$ Pellets", Korea Atomic Energy Research Institute, Published Sep. 11, 2013. Nuclear Engineering and Technology, vol. 46, No. 1, Feb. 2014, 8 pages.

M.W.D. Cooper et al., "The role of dopant charge state on defect chemistry and grain growth of doped $UO_2$", Acta Materialia, vol. 150, Mar. 2, 2018, pp. 403-413, URL: https://doi.org/10.1016/l.actamat.2018.02.020.

\* cited by examiner

SINTERING ADDITIVE FOR FORMING FILM CAPABLE OF IMPROVING OXIDATION RESISTANCE OF NUCLEAR FUEL PELLETS, AND PREPARATION METHOD THEREFOR

CROSS-REFERENCE TO RELATED APPLICATIONS

This patent application is a continuation of International Application No. PCT/KR2019/014543, filed on Oct. 31, 2019, which claims the benefit of priority to Korean Patent Application No. 10-2019-0118276, filed on Sep. 25, 2019, the entireties of which are incorporated herein by reference thereto.

BACKGROUND

The present disclosure relates to nuclear fuel pellets capable of suppressing an increase in weight due to oxidation in a steam atmosphere and a method for manufacturing the same. More particularly, the present disclosure relates to a method of preparing sintered pellets capable of suppressing an increase in the weight by inhibiting surface oxidation using a principle that the uranium oxide powder contains chromium, manganese, and silicon oxide as additives, and creates a liquid phase upon sintering to produce a nuclear fuel sintered pellet, which promotes the movement of uranium atoms, making the grain thereof larger and finally forming a film on the grain boundaries.

Nuclear power generation companies emphasized the need to improve nuclear fuel performance for economical operation because there it is required to lower the unit cost of electricity production.

Nuclear fuel development companies had developed long-term/high-combustibility sintered pellets from the 1980s to the early 2000s. However, as interest in the safety of nuclear power has recently increased, the newly developed nuclear fuel is also required to have improved safety performance.

In order to develop a nuclear fuel with an increased operating margin to improve the safety of a nuclear reactor core, nuclear fuel manufacturing companies have improved the performance of uranium dioxide ($UO_2$) sintered pellets by adding oxides in a concentration of several hundred to several thousand ppm per weight. According to licensing reports (for example, Licensing Topical Report, GNF NEDC-33106P, Rev.2/AREVAANP-10340NP) prepared by existing nuclear fuel manufacturing companies (GNF, AREVA) for commercial production and for supply of sintered pellets containing development additives, it can be seen that not only experiments on economical combustion but also experiments related to safety evaluation were conducted. In particular, the weight increase due to the oxidation reaction of the $UO_2$ sintered pellets caused by the inflow of cooling water or steam into the damaged fuel rod due to fuel rod damage was evaluated.

In general, damage to a fuel rod during in-furnace combustion causes corrosion of the $UO_2$ sintered pellets in a water or steam atmosphere at 360° C. to 1200° C. As shown in Reaction Scheme 1 below, the sintered pellets are oxidized as the ratio of O/U=2.0 of $UO_2$ gradually increases for each step.

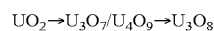    [Reaction Formula 1]

$U_3O_8$ generated after a total of second times phase transformations is fragmented and separated from $UO_2$ because of the change in the crystal structure due to the phase transformation. The crystal structure maintains a cubic structure from $UO_2$ to $U_4O_9$ but changes to an orthorhombic structure from $U_3O_8$, and the density decreases by about 20% to 8.35 g/cm³ (volume increases), so the internal stress is generated. This is because the corresponding stress eventually exceeds the fracture stress, and fragmentation occurs. Fragmentation caused by phase transformation to $U_3O_8$ due to $UO_2$ oxidation is directly related to the leakage of radioactive fissile material out of the fuel rod when the fuel rod is damaged. Therefore, the oxidation resistance of $UO_2$ has a great influence on the safety margin of the nuclear reactor.

The process of fragmentation is as follows. An initial oxidation reaction occurs from the surface. Oxygen atoms fill the lattice voids of $UO_2$. At this time, the valence of the existing U is changed from +4 to +6 to satisfy electron neutrality in the lattice. Accordingly, the bonding force between atoms becomes stronger, and the spacing between atoms becomes narrower. As a result, the density increases by about 10%, and the surface of $UO_2$, where the initial oxidation occurred, shrinks as a whole. As a result, microcracks occur at grain boundaries where interatomic bonding is weak, and oxygen moves rapidly along the grain boundary cracks created in this way. The grain boundary is a fast diffusion path for oxygen atoms and a high-energy state in which the bonds between atoms are broken, so oxidation proceeds quickly.

In K. Une, Journal of Nuclear Materials, 232 (1996) 240-247, as a result of an oxidation test of $UO_2$ in water at 340° C. for 50 hours, it was reported that the penetration depth of the corrosion layer decreased as the grain size increased. In the method proposed by Korean Patent No. 10-0446587, the grain size obtained by adding oxidizing additives to have a weight ratio of (Mn+Cr+Al)/U of 0.005% to 0.15% by weight and sintering in a weakly oxidizing (gas ratio: $CO_2/H_2$=0.3% to 1.6% by weight) atmosphere was 4 to 6 times larger than that of 8 μm, which is the crystal size of a general $UO_2$ sintered pellets. In general, the creep rate increases as the grain size increases.

However, from the viewpoint of changes in the sintered state due to furnace combustion, the oxidation rate cannot be reduced simply by the grain size. The reason is that as the degree of combustion increases, fission products accumulate inside the fuel, swelling occurs, and at the same time, internal stress is applied due to heat gradient, causing cracks throughout the sintered pellets to progress through grain boundaries. In addition, on the outside of the $UO_2$ sintered pellets having an average degree of combustion of 40 GWd/tM or more, a porous rim structure in which bubbles are scattered in the $UO_2$ matrix is formed at the grain boundary. After all, since such cracks and rim structures are formed on grain boundary surfaces with broken bonds vulnerable to oxidation, the inflow of an oxidizing agent from the outside increases the oxidation reactivity explosively. Therefore, even if the oxidation reaction rate is reduced by simply making the grain boundaries larger, grain size growth cannot be the perfect solution from the viewpoint of material deterioration resulting from in-furnace combustion.

In addition, the liquid phase that may exist at the grain boundary mentioned in the present disclosure is, as shown in the phase diagram of K. T. Jacob, Can. Metall. Q., 20 89-92 (1981), MnO—$Al_2O_3$ appears to form a liquid phase at a temperature of 1540° C., and thus, in a general $UO_2$ sintering atmosphere, $Cr_2O_3$ is reduced to CrO and then volatilized. In addition, through several experiments, it can be seen that MnO—$Al_2O_3$ also undergoes rapid volatilization in an oxidizing atmosphere. As a result, the effect of the additive of the patent on suppressing steam oxidation that proceeds along the grain boundary is considered to be insignificant due to the volatilization of $Cr_2O_3$ and $MnO-Al_2O_3$.

In the method suggested by Korean Patent No. 10-0521638, $UO_2$ containing $SiO_2$, CaO, and $Cr_2O_3$ (weight ratio, 35 to 55:45 to 65:1 to 7) additives are sintered at 1700° C. in $H_2$+5% $CO_2$ atmosphere for 4 hours to form a liquid phase in grain boundaries and apply external stress to show the rapid creep deformation. Through this, a result of offsetting the stress transferred to the clad surrounding the $UO_2$ sintered pellets can be obtained. However, such an increase in creep deformation rate was obtained only when an excess of 3000 ppm (0.3% by weight) or more was added. In addition, since the grain size is also small (about 6 μm to 8 μm), the embodiment cannot be a good solution in terms of resistance to oxidation at high temperature because the grain boundary area where the rapid oxidation progress by high-temperature steam is triggered is large. In addition, CaO and $CaCO_3$, which are alkali oxides, are very active in reactivity with steam or water as the main components of lime and are not suitable as grain coating materials for oxidation inhibition.

Accordingly, in order to improve the oxidation resistance of a nuclear fuel pellets, the present inventors have devised a method for lowering the oxidation reaction rate not only to reduce the area of a region vulnerable to oxidation reaction by accelerating the grain growth rate but also suppress contact with the oxidizing agent by coating the grain boundary with an oxide with excellent oxidation resistance and low volatility.

PATENT LITERATURE (Patent literature 1) Korea Patent No. 10-0446587 (2004 Aug. 23)
(Patent literature 2) Korea Patent No. 10-0521638 (2005 Oct. 6)

Non-Patent Literature (Non-patent literature 1) GNF, Additive Fuel Pellets for GNF Designs, NEDO-33406 (2009)
(Non-patent literature 2) AREVA, Incorporation of Chromia-Doped Fuel Properties in AREVA Approved Methods, ANP-10340NP (2016)
(Non-patent literature 3) K. Une, Journal of Nuclear Materials, 232 (1996) p. 240 to 247.
(Non-patent literature 4) K. T. Jacob, Cam. Metal. Q., (1981) p. 89 to 92

BRIEF SUMMARY

An objective of the present disclosure is to improve the safety of nuclear power plants by suppressing the release of nuclear fission materials flowing out to coolant together with corrosion products of $UO_2$ by lowering the rate of nuclear fuel pellets oxidation due to the steam atmosphere when nuclear fuel rods used in nuclear power plants are damaged.

In order to achieve the above objective, the present disclosure provides uranium dioxide nuclear fuel pellets. According to an aspect of the present disclosure, uranium dioxide nuclear fuel pellets include: uranium dioxide ($UO_2$); and a sintering additive made of $Cr_2O_3$, MnO, and $SiO_2$.

The sintering additive is 0.05% to 0.16% by weight per 100% by weight of $UO_2$, and the sintering additive may be mixed with 20% to 40% by weight of $Cr_2O_3$, 30% to 50% by weight of MnO, and 20% to 40% by weight of $SiO_2$.

In addition, another aspect of the present disclosure is to provide a method of manufacturing uranium dioxide nuclear fuel pellets. The method for manufacturing nuclear fuel pellets, the method includes steps of: 1) mixing sintering additive powders consisting of $Cr_2O_3$, MnO, and $SiO_2$ to uranium dioxide ($UO_2$) powder to prepare a mixed powder; 2) preparing a molded body by compression molding; and 3) heating and sintering the molded body under a reducing atmosphere. The sintering additive powder of step 1) may be added in an amount of 0.05% to 0.16% by weight per 100% by weight of $UO_2$, and the sintering additive powder of step 1) may be mixed with 20% to 40% by weight of $Cr_2O_3$, 30% to 50% by weight of MnO, and 20% to 40% by weight of $SiO_2$.

The compression molding pressure of step 2) may be 3 tons/cm$^2$.

The heating and sintering temperature of step 3) may be 1730° C. to 1760° C., and in the reducing atmosphere, an oxygen potential may be −581.9 kJ/mol to −218.2 kJ/mol.

According to the present disclosure as described above, the $UO_2$ sintered pellets to which $Cr_2O_3$, MnO, and $SiO_2$ are added have large crystal grains, and at the same time, show high oxidation resistance in a high-temperature steam atmosphere due to an additive film formed at the grain boundaries. Therefore, due to the oxidation of $UO_2$, $UO_2$ becomes $U_3O_8$ and reduces the amount of $UO_2$ oxide that is finely fragmented and falls apart, thereby preventing the loss of fission materials to the cooling water when the fuel rod is damaged.

DETAILED DESCRIPTION

Hereinafter, embodiments of the present disclosure will be described in detail.

The present disclosure provides nuclear fuel pellets having excellent oxidation resistance capable of lowering an oxidation rate of a $UO_2$ sintered pellets at a high temperature, and a preparation method using the same. The nuclear fuel pellets of the present disclosure include a sintering additive made of $Cr_2O_3$, MnO, and $SiO_2$, which is sintered in a reducing atmosphere to form a liquid phase to promote grain growth, and as a result, to form an additive film at the grain boundary, thereby lowering the oxidation rate of the $UO_2$ sintered pellets at high temperature.

Figure 1:
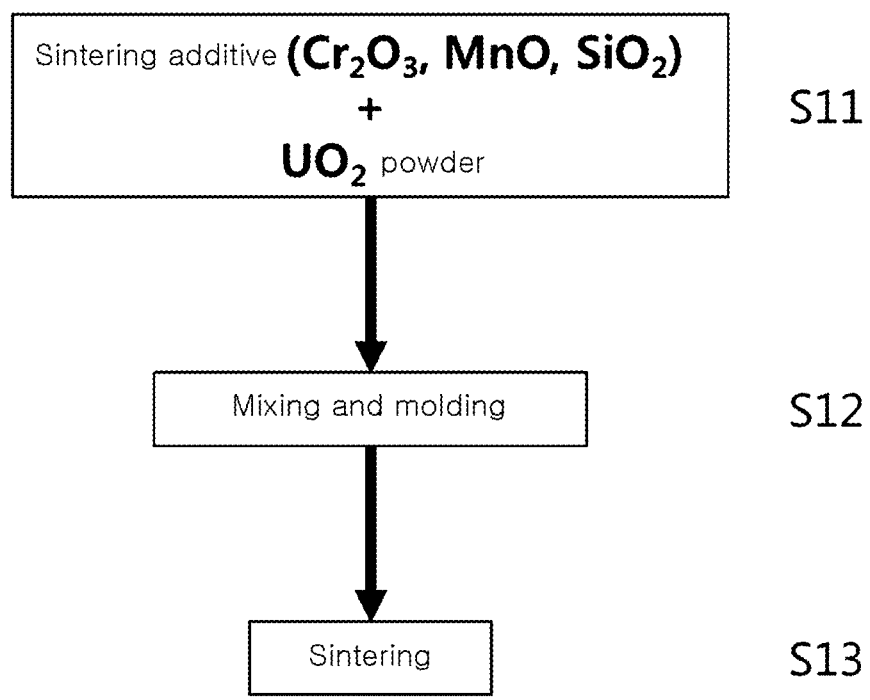
FIG. 1 is a schematic process flowchart of a $UO_2$ sintered pellets preparing method according to an embodiment of the present disclosure.

According to the present disclosure, FIG. 1 is a process flow chart showing a method for manufacturing nuclear fuel pellets. Referring to FIG. 1, the method for preparing nuclear fuel pellets of the present disclosure includes steps of: 1) adding and mixing an additive powder made of $Cr_2O_3$, MnO, and $SiO_2$ based on uranium dioxide ($UO_2$) powder to prepare a mixed powder (S11); 2) preparing a molded body by compression molding the mixed powder (S12); and 3) heating and sintering the molded body in a reducing atmosphere (S13).

The total amount of the sintering additive added in step (S11) may be 0.05% to 0.16% by weight per 100% by weight of $UO_2$. When the amount of the sintering additive is less than 0.05% by weight, sufficient grain growth cannot be promoted, and a liquid fraction capable of coating grain boundaries is not generated. When the amount of the sintering additive is 0.16% by weight or more, since thermal neutrons required for the nuclear fission chain reaction are shielded by additional elements with a large thermal neutron absorption cross-sectional area, the concentration of fissionable U-235 is also less economical. Therefore, the range in which resistance to oxidation due to high-temperature steam may be effectively exhibited and thermal neutron economic feasibility may be maintained is preferably 0.05% to 0.16% by weight.

In step (S11), the sintering additive may be mixed in a ratio of 20% to 40% by weight of $Cr_2O_3$, 30% to 50% by weight of MnO, and 20% to 40% by weight of $SiO_2$ per 100% by weight of the sintering additive.

$Cr_2O_3$

When $Cr_2O_3$ is added to the $UO_2$ matrix, vacant point defects of $U^{4+}$ ions in the lattice are generated to satisfy charge neutrality in the matrix, and thus, the grain growth of the $UO_2$ sintered pellets is promoted by increasing the diffusion rate of the $U^{4+}$ ions. In the case of a sintered pellets doped with 0.16% by weight of $Cr_2O_3$ per 100% by weight of $UO_2$ manufactured by AREVA Co., the range of 0.05% by weight of $Cr_2O_3$ that can be dissolved in the $UO_2$ matrix was excessively exceeded. Excessively exceeded $Cr_2O_3$ is to further promote grain growth by reducing $Cr_2O_3$ that is not dissolved in the $UO_2$ sintering temperature range to a liquid CrO form.

Therefore, in the nuclear fuel sintered additive according to this disclosure, $Cr_2O_3$ should be added in an amount of less than 0.05% by weight per 100% by weight of $UO_2$, which is a range that may be dissolved in $UO_2$, to prevent the formation of a liquid phase $Cr_2O_3$ alone, because a dense oxide film cannot be formed in the case of a liquid phase formed only of $Cr_2O_3$. Therefore, $Cr_2O_3$ should react with MnO and $SiO_2$ to form a dense compound. At this time, 0.015% by weight or more of $Cr_2O_3$ should be added per 100% by weight of $UO_2$ in order to make the minimum compound fraction capable of exhibiting oxidation resistance performance. Therefore, it is preferable to add 0.015% to 0.05% by weight of $Cr_2O_3$ per 100% by weight of $UO_2$.

MnO

MnO exists in a solid form because its solubility is low in the $UO_2$ matrix, and its phase transformation does not occur in a liquid phase even at a sintering temperature when added in a single composition, which eventually hinders crystal grain growth. However, when MnO reacts with $Cr_2O_3$ and $SiO_2$, a liquid compound is formed from a temperature lower than the sintering temperature (1730° C. to 1780° C.). As shown in the $Cr_2O_3$—MnO—$SiO_2$ three-component phase diagram at 1500° C. in FIG. 3, it can be seen that the liquid phase fraction increases when the content of MnO is increased. Eventually, the increase of the liquid fraction promotes the growth of $UO_2$ grains, so the higher the ratio of MnO, the better. However, according to the specification, the combined amount of $SiO_2$ and MnO in the impurity concentration of the nuclear fuel pellets cannot exceed 0.12% by weight per 100% by weight of $UO_2$. It is preferable to add the MnO amount to 0.06% by weight or less. In addition, a $Cr_2O_3$—MnO—$SiO_2$ compound capable of at least maintaining oxidation resistance performance may be applied to a grain boundary where an oxidation reaction is initially started. The $Cr_2O_3$—MnO—$SiO_2$ compound is preferably added in an amount of at least 0.02% by weight to suppress a reaction between $UO_2$ and the oxidizing agent.

$SiO_2$ $SiO_2$ has excellent fission gas capture performance capable of reacting with fission products generated by nuclear fission to form a compound. In addition, as shown in the state diagram of FIG. 3, a liquid compound is formed together with $Cr_2O_3$ and MnO at the vicinity of the sintering temperature to promote grain growth. However, it is desirable to add 0.05% by weight or less per 100% by weight of $UO_2$ to satisfy the impurity concentration criteria of the nuclear fuel pellets. In order to exhibit oxidation resistance performance, 0.015% by weight or more per 100% by weight of the $UO_2$ may be preferably added to satisfy the minimum liquid volume fraction required to coat the $Cr_2O_3$—MnO—$SiO_2$ liquid compound at the grain boundary.

The compound of this composition is to exhibit an oxidation resistance that is about 5 times higher than that of pure $UO_2$ in a steam atmosphere of 1200° C.

Step (S12) is mixing and molding the additive together with the $UO_2$ powder. After mixing using a Nauta mixer, the mixed powder is put into the molding mold, and the molded body is prepared at a pressure of 3 tons/cm².

Figure 2:
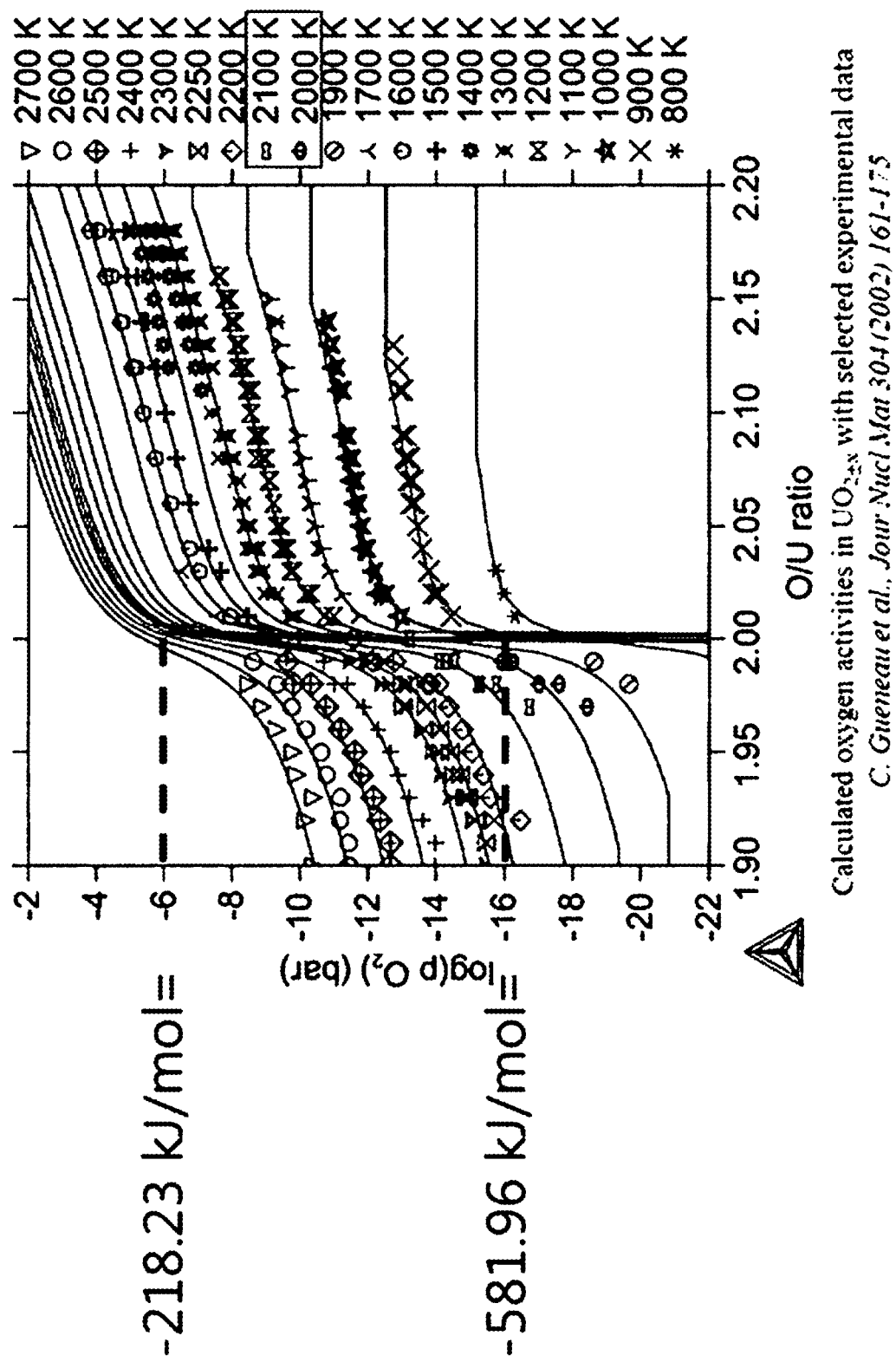
FIG. 2 is thermodynamic data showing a calculated value of an oxygen potential in which the O/U ratio of the $UO_2$ sintered pellets can be maintained at 2.0 at the sintering temperature according to an embodiment of the present disclosure.

Step (S13) is sintering the molded body, and sintering may be performed at a temperature range of 1730° C. to 1760° C. for 4 to 6 hours. Sintering may be performed in an atmosphere in which an oxygen potential is −581.9 kJ/mol to −218.2 kJ/mol (reducing atmosphere). In this case, referring to FIG. 2, it may be seen that the O/U ratio is more stable at 2.0 in the corresponding an oxygen potential atmosphere. For reference, when the sintering atmosphere is formed at −581.9 kJ/mol or less or −218.2 kJ/mol or more, the O/U ratio of $UO_2$ increases to 2.0 or more, so that the crystal structure is deformed and cracks are generated outside and inside the sintered pellets.

Figure 3:
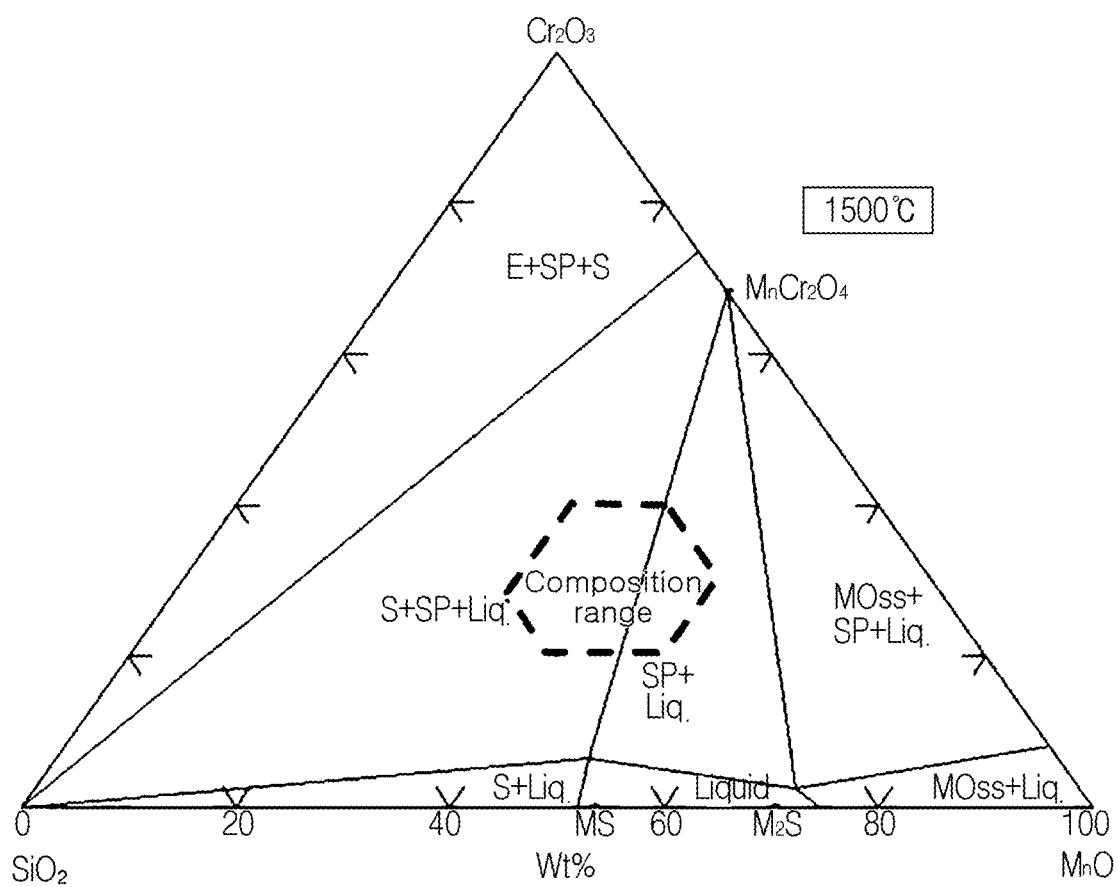
FIG. 3 is a graph showing a state and composition ratio of $Cr_2O_3$, MnO, and $SiO_2$ according to an embodiment of the present disclosure.

Referring to FIG. 3, it can be confirmed that the liquid phase of the additive oxides can be formed from 1500° C., which is lower than the target sintering temperature of 1730°

Figure 4:
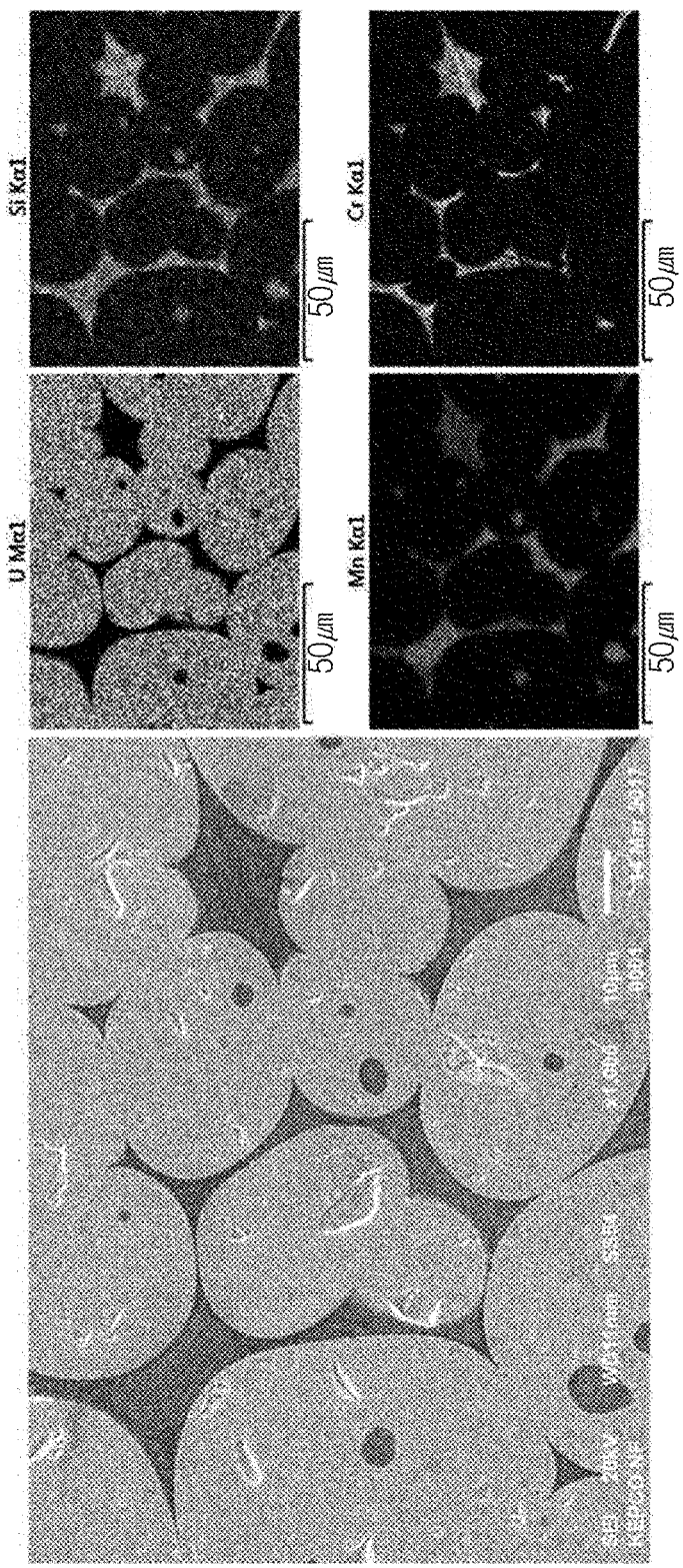
FIG. 4 is a scanning electron microscope photograph and X-ray spectrometer (Energy Dispersive Spectrometer, EDS) result showing the microstructure of $UO_2$ sintered pellets containing 10% by weight of $Cr_2O_3$, MnO, and $SiO_2$ according to an embodiment of the present disclosure.

C. to 1760° C. The presence of oxides contained Cr, Mn, and Si can be confirmed as shown in FIG. 4. The oxide composed of Cr, Mn, and Si surrounds the $UO_2$ grain boundary, and it seems that the oxide existed as a liquid phase at a sintering temperature. Since a film having excellent oxidation resistance was formed at the grain boundary through the above-described process, the weight increase due to oxidation may be about ⅕ lower than that of pure $UO_2$.

The sintered uranium dioxide nuclear fuel pellets of the present disclosure include: uranium dioxide ($UO_2$); and a sintering additive consisting of $Cr_2O_3$, MnO, and $SiO_2$.

The sintering additive may be 0.05% to 0.16% by weight per 100% by weight of $UO_2$.

The sintering additive may be mixed in a ratio of 20% to 40% by weight of $Cr_2O_3$, 30% to 50% by weight of MnO, and 20% to 40% by weight of $SiO_2$ per 100% by weight of the sintering additive.

Hereinafter, the present disclosure will be described in more detail through examples. These examples are only for illustrating the present disclosure, and it will be apparent to those of ordinary skilled in the art that the scope of the present disclosure is not to be construed as being limited by these examples.

EXAMPLE

An additive consisting of $Cr_2O_3$, MnO, and $SiO_2$ in a total amount of 0.1% by weight was added to the $UO_2$ powder. At this time, the ratio of $Cr_2O_3$, MnO, and $SiO_2$ constituting 0.1% by weight was 3:4:3, respectively (see Table 1). After mixing for 4 hours in a 3-axis rotary mixer, the molded body was prepared by compressing at 3 ton/$cm^2$ pressure. The molded body was heated to 1750° C. at a rate of 5° C./min and then sintered for 4 hours. The atmosphere kept the oxygen potential at −380 kJ/mol during sintering.

Comparative Examples 1 to 3

In order to confirm the minimum required liquid fraction for improving oxidation resistance and growing grain size, $UO_2$ sintered pellets were prepared using the methods in Comparative Examples 1 to 2 (see Table 1). In addition, in order to confirm the deterioration of the oxidation resistance performance due to a ratio exceeding an appropriate $Cr_2O_3$, $UO_2$ sintered pellets were prepared in Comparative Example 3 (see Table 1) using the same method as the preparing method of the Example.

Comparative Example 4

For comparison with Example, pure $UO_2$ sintered pellets without additives were prepared by the same preparing process as in Example.

Comparative Example 5

Although crystal grain growth is promoted by the additive, in order to confirm the effect of liquid phase volatilization under oxidation conditions on the deterioration in oxidation resistance, an additive consisted of $Cr_2O_3$, MnO, and $Al_2O_3$ was added in an amount of 0.1% by weight. At this time, the ratio of $Cr_2O_3$, MnO, and $Al_2O_3$ constituting 0.1% by weight was 7:2:1, respectively. $UO_2$ sintered pellets were prepared in the same method as the preparing method of the Example.

Comparative Example 6

In order to investigate the low oxidation resistance when the liquid phase is formed by the additive but the grain growth is insufficient, an additive composed of $Cr_2O_3$, CaO, and $SiO_2$ was added so as to be 0.1% by weight. At this time, the ratio of $Cr_2O_3$, CaO, and $SiO_2$ constituting 0.1% by weight was 4:5:1, respectively. $UO_2$ sintered pellets were prepared in the same manner as the preparing method of the Example.

Measurement Example 1. Grain Size Measurement

Figure 8:
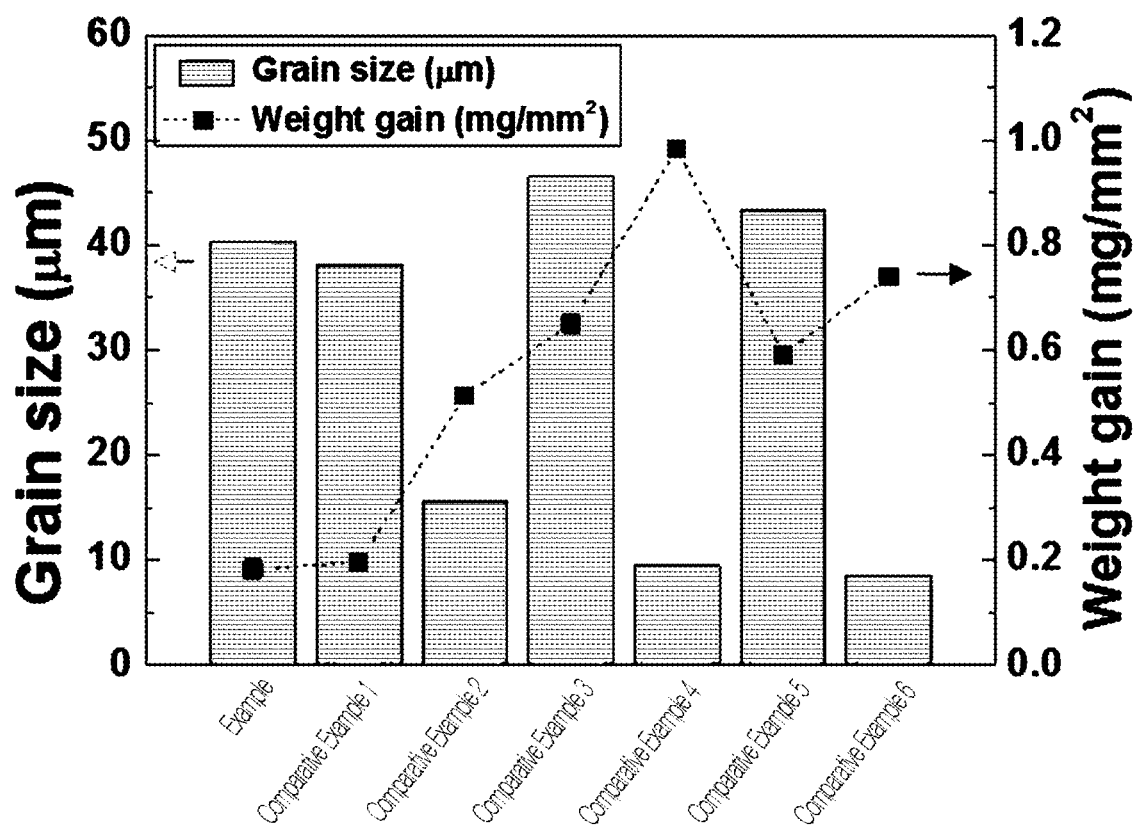
FIG. 8 is a graph showing the crystal grain size of the sintered pellets prepared according to an embodiment of the present disclosure and the sintered pellets prepared according to Comparative Examples 1 to 6 and the high-temperature steam oxidation measurement values test at once.

The grain sizes of the $UO_2$ sintered pellets prepared in Examples and Comparative Examples 1 to 6 were measured using a straight-line crossing method, and the results are shown in Table 2 and FIG. 8.

TABLE 1

|  | Additive % by weight per 100% by weight of $UO_2$ | % by weight of additive per 100% by weight of sintering additive (% by weight of additive per 100% by weight of $UO_2$) | | | | |
|---|---|---|---|---|---|---|
|  |  | $Cr_2O_3$ | MnO | $SiO_2$ | $Al_2O_3$ | CaO |
| Example | 0.1 | 30 (0.03) | 40 (0.04) | 30 (0.03) | — | — |
| Comparative Example 1 | 0.05 | 30 (0.015) | 40 (0.02) | 30 (0.015) | — | — |
| Comparative Example 2 | 0.03 | 30 (0.009) | 40 (0.012) | 30 (0.009) | — | — |
| Comparative Example 3 | 0.1 | 70 (0.07) | 20 (0.02) | 10 (0.01) | — | — |
| Comparative Example 4 | 0 | — | — | — | — | — |
| Comparative Example 5 | 0.1 | 70 (0.07) | 20 (0.02) | — | 10 (0.01) | — |
| Comparative Example 6 | 0.1 | 40 (0.04) | — | 10 (0.01) | — | 50 (0.05) |

Measurement Example 2. Microstructure Observation

Figure 5:
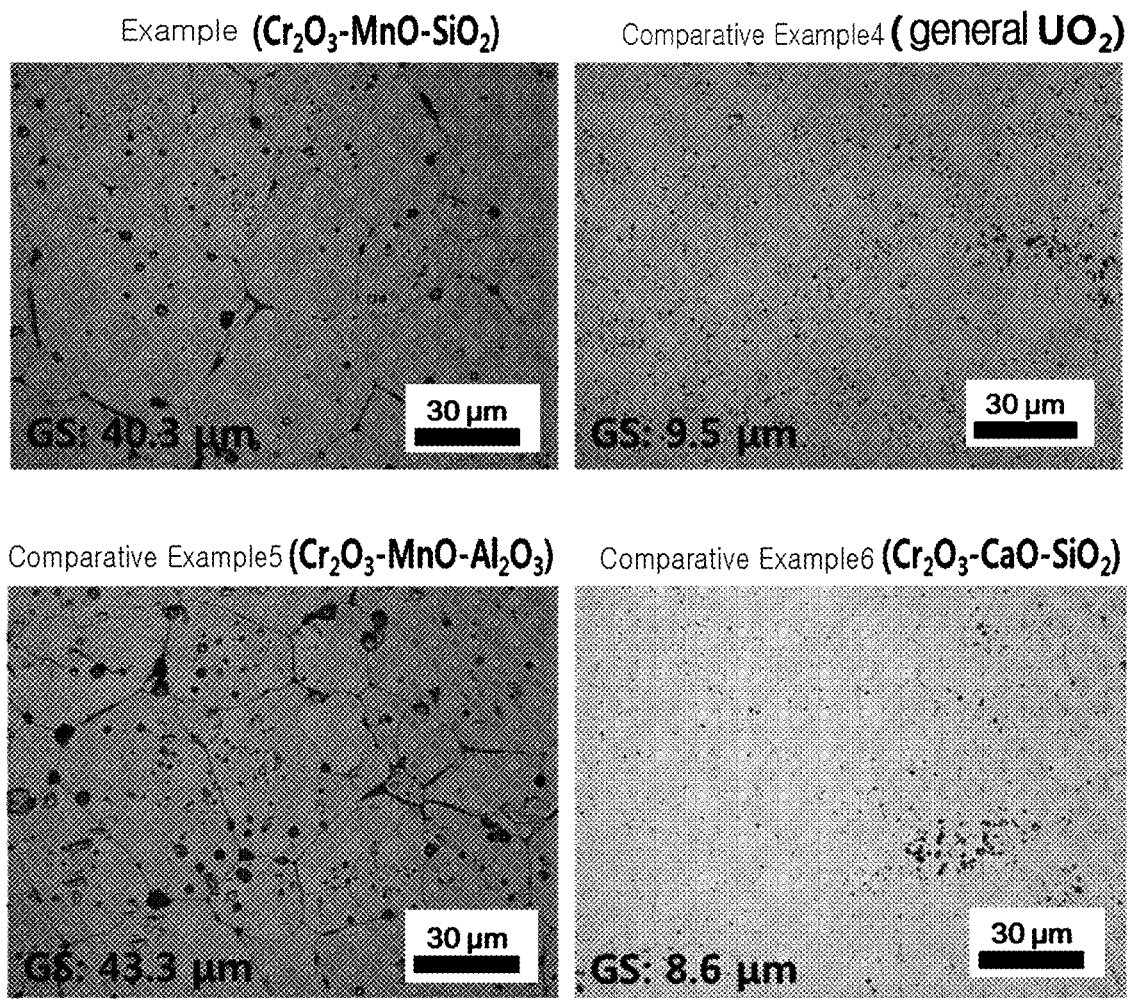
FIG. 5 is an optical micrograph showing the microstructure of the $UO_2$ sintered pellets containing 0.1% by weight of $Cr_2O_3$, MnO, and $SiO_2$ according to an embodiment of the present disclosure and sintered pellets prepared according to Comparative Examples 4 to 6.

After mechanically cutting the cross section of the sintered pellets prepared by the methods of the Example and Comparative Examples, the surface microstructure of the sintered pellets was observed with an optical microscope through polishing and heat etching. The results are shown in FIG. 5.

Measurement Example 3. High-Temperature Steam Oxidation Test

Figure 7:
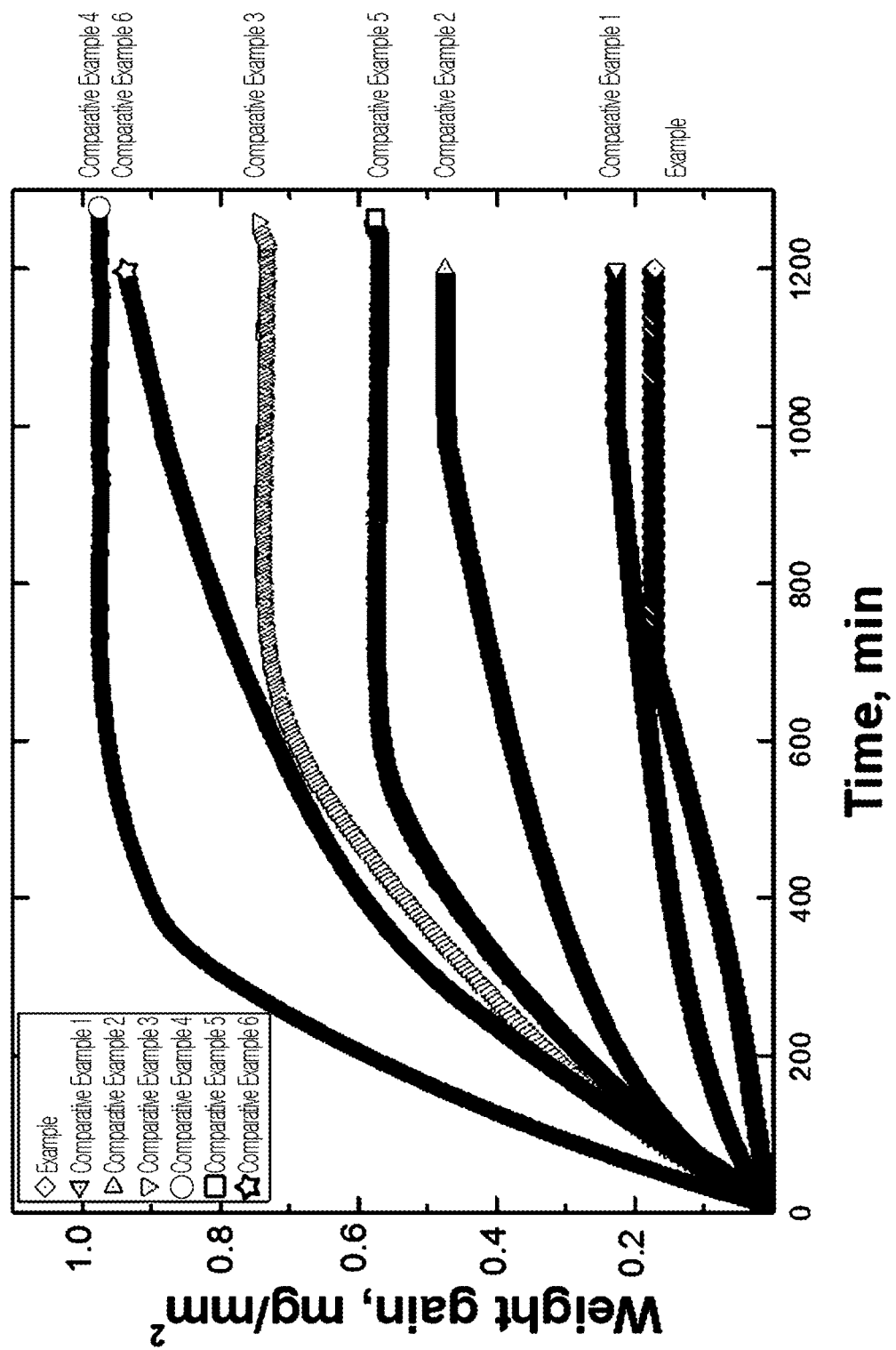
FIG. 7 is a graph showing the amount of increase in weight per unit surface area that changes with time when a high-temperature steam oxidation test is performed on the sintered pellets prepared according to an embodiment of the present disclosure and the sintered pellets prepared according to Comparative Examples 1 to 6.

A high-temperature steam oxidation experiment was performed with the sintered pellets prepared by the methods of the Example and Comparative Examples 1 to 6 above. The sintered pellets prepared by the methods of the Example and Comparative Examples 1 to 6 were oxidized by exposing the sintered pellets to steam at 1200° C., and a thermogravimetric analyzer was used to measure the weight increase in real-time. At this time, the resulting weight increase was calculated and expressed per unit surface area because the oxidation reaction area increased as the surface area increased. Each of the sintered pellets was loaded into a thermogravimetric analyzer, and argon gas flowed thereto, and the temperature was raised to 1200° C. at a rate of 30° C./min. After reaching the target temperature of 1200° C., steam was injected at 40 ml/min and oxidation was performed for 20 hours, and the weight was observed to increase over time. FIG. 7 shows the results of high-temperature steam oxidation of the $UO_2$ sintered pellets prepared by the method of the Example and Comparative Examples 1 to 6 as a graph of time-weight increase/surface area.

TABLE 2

|  | Example | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Grain size (μm) | 40.3 | 38.1 | 15.6 | 46.5 | 9.5 | 43.3 | 8.6 |
| Weight increase (mg/mm$^2$) | 0.184 | 0.211 | 0.485 | 0.734 | 0.980 | 0.592 | 0.941 |

As shown in FIGS. 7 and 8, the sintered pellets prepared by the method of the Example is 0.184 mg/mm$^2$, Comparative Example 4 is 0.980 mg/mm$^2$ (5.3 times compared to the Example), and Comparative Example 5 is 0.592 mg/mm$^2$ (3.2 times compared to the Example) and Comparative Example 6 was 0.941 mg/mm$^2$ (5.1 times compared to the Example), which increased the weight relative to the specific surface area.

When $Cr_2O_3$—MnO—$SiO_2$ of Comparative Example 1 was added in an amount of 0.05% by weight per 100% by weight of $UO_2$, the crystal grain size, as well as the high-temperature oxidation resistance, seem similar to those of the Example. However, when 0.04% by weight was added as in Comparative Example 2, crystal grain growth and resistance to high-temperature oxidation were reduced due to a decrease in the liquid fraction formed by the additive.

As in Comparative Example 3, when the $Cr_2O_3$ additive was added in an amount of 0.07% by weight per 100% by weight of $UO_2$, the $Cr_2O_3$ additive was added in an excess ratio of MnO (0.02% by weight) and $SiO_2$ (0.01% by weight), so that a liquid phase consisting of $Cr_2O_3$—MnO—$SiO_2$ component was not sufficiently produced. However, although the grain size is increased due to the liquid phase generated by $Cr_2O_3$ alone due to the reduction of $Cr_2O_3$ that did not form a liquid phase without MnO and $SiO_2$, the oxidation resistance performance according to the additive self-oxidation and insufficient $Cr_2O_3$—MnO—$SiO_2$ liquid fraction in an oxidizing atmosphere seemed to be degraded.

This is because the area of the grain boundary is large since the general $UO_2$ grain size of Comparative Example 4 was less than 10 μm, and thus an oxidation reaction due to penetration of high-temperature steam has actively occurred.

Figure 6:
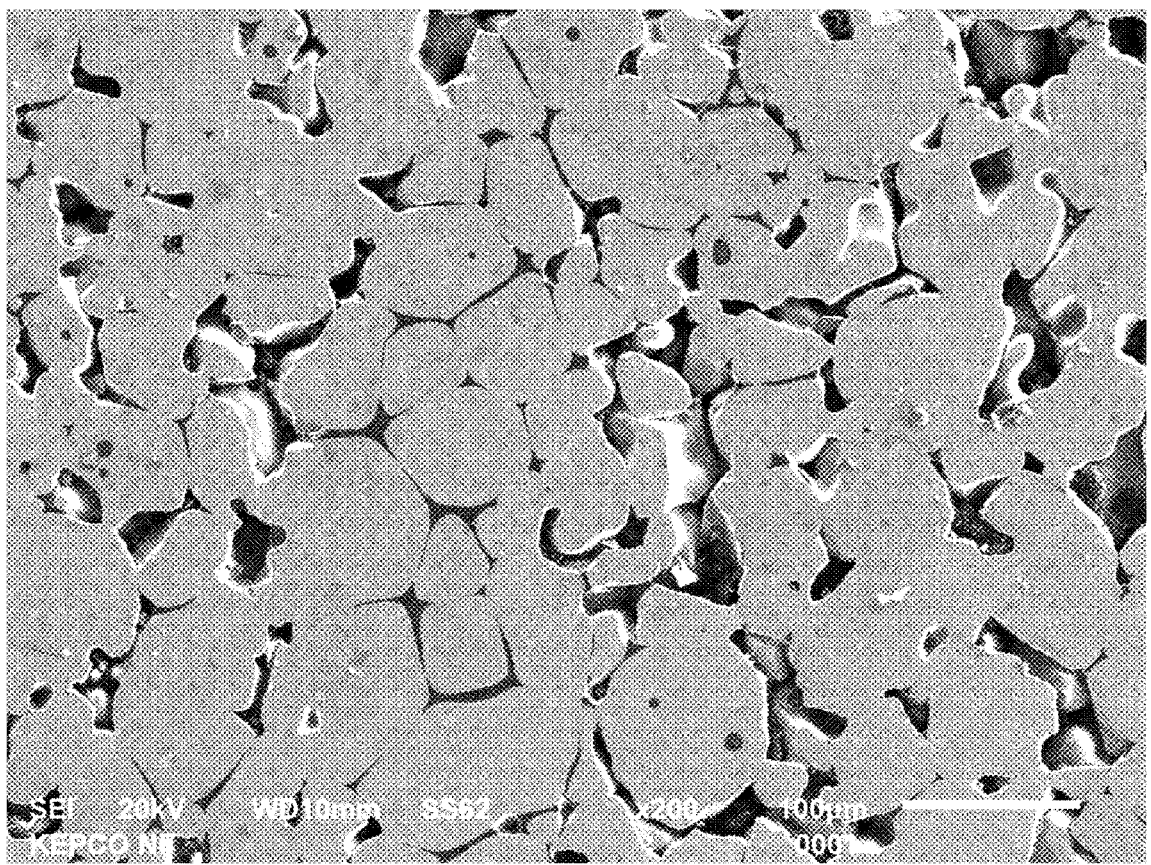
FIG. 6 is an optical micrograph showing the microstructure of the $UO_2$ sintered pellets containing 10% by weight of $Cr_2O_3$, MnO, and $Al_2O_3$ prepared according to Comparative Example 5 of the present disclosure.

As in Comparative Example 5, $Cr_2O_3$—MnO—$Al_2O_3$ added $UO_2$ was composed of large grains of 40 μm or more, but as shown in FIG. 6, since high-temperature steam and grains react quickly through pores formed at the grain boundary by volatilization of $Cr_2O_3$ or MnO—$Al_2O_3$, the oxidation rate seems to be about three times higher than the oxidation rate of the Example.

As in Comparative Example 6, $Cr_2O_3$, CaO, and $SiO_2$ added $UO_2$ has a liquid phase formed at a grain boundary but has an average grain size of fewer than 10 μm, the grain boundary area in which the oxidation reaction rate occurs rapidly is large, and thus, the oxidation seems to have occurred four times faster compared to the embodiment of the Example.

As described above, it will be apparent to those skilled in the art that such a specific technique is merely a preferred embodiment, and thus the scope of the present disclosure is not limited thereto. Accordingly, it is intended that the substantial scope of the present disclosure be defined by the appended claims and their equivalents.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Uranium dioxide nuclear fuel pellets comprising:
   uranium dioxide ($UO_2$); and
   a sintering additive;
   wherein the sintering additive comprises $Cr_2O_3$, MnO, and $SiO_2$;
   wherein the sintering additive is 0.05 to 0.16 parts by weight per 100 parts by weight of the uranium dioxide ($UO_2$); and
   wherein the sintering additive comprises 20% to 40% by weight of $Cr_2O_3$, 30% to 50% by weight of MnO, and 20% to 40% by weight of $SiO_2$.

* * * * *